(12) United States Patent
Cho et al.

(10) Patent No.: US 8,421,599 B2
(45) Date of Patent: Apr. 16, 2013

(54) APPARATUS AND METHOD FOR PROVIDING URL, MOBILE STATION, AND METHOD FOR ACCESSING INTERNET BY USING THE PROVIDED URL

(75) Inventors: Seung-Kwon Cho, Guri-si (KR); Su-Chang Chae, Daejeon (KR); Young-Il Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 545 days.

(21) Appl. No.: 12/516,159

(22) PCT Filed: Jun. 15, 2007

(86) PCT No.: PCT/KR2007/002932
§ 371 (c)(1),
(2), (4) Date: May 22, 2009

(87) PCT Pub. No.: WO2008/069381
PCT Pub. Date: Jun. 12, 2008

(65) Prior Publication Data
US 2010/0019888 A1 Jan. 28, 2010

(30) Foreign Application Priority Data
Dec. 6, 2006 (KR) .................. 10-2006-0122861

(51) Int. Cl.
*H04Q 5/22* (2006.01)
*G06F 15/173* (2006.01)

(52) U.S. Cl.
USPC ....... 340/10.5; 340/10.4; 340/572.1; 709/225

(58) Field of Classification Search ............. 340/10.5, 340/572.1; 709/220, 225
See application file for complete search history.

(56) References Cited

U.S. PATENT DOCUMENTS 7,274,909 B2 * 9/2007 Perttila et al. ............. 455/41.2
7,333,001 B2 * 2/2008 Lane et al. ................ 340/10.1
(Continued)

FOREIGN PATENT DOCUMENTS

EP 1 085 431 A2 3/2001
KR 10-2005-0045631 A 5/2006
(Continued)

OTHER PUBLICATIONS

X-Modem_CE_manual—accessed May 23, 2012, http://web.archive.org/web/20040509202956/http://www.adslnation.com/downloads/X-Modem_CE_manual.pdf, published on or before May 9, 2004 (evidenced by pp. 1-3 of X-Modem_CE_manual found at http://wayback.archive.org/web/20040715000000*/http://www.adslnation.com/downloads/X-Modem_CE_manual.pdf).*

*Primary Examiner* — Daniel Wu
*Assistant Examiner* — Mohamed Barakat
(74) *Attorney, Agent, or Firm* — Jefferson IP Law, LLP

(57) ABSTRACT

The present invention relates to a URL providing apparatus and a method thereof, and a mobile station that accesses the Internet by using the provided URL, and an Internet access method thereof. The mobile station attaches an RF-ID tag that stores an RF-ID tag value corresponding to identification information of the mobile station thereto, and thus when a user brings the mobile station into an interrogation range of an RF-ID reader included in the URL providing apparatus, the URL providing apparatus receives the corresponding RF-ID tag value from the RF-ID reader. When the URL providing apparatus acquires an IP address of the mobile station by using the received RF-ID tag value and provides a URL to the mobile station by using the acquired IP address, the mobile station automatically accesses the Internet by using the URL. Such an Internet access method can minimize additional cost of the mobile station and simplify an Internet access process to a specific URL.

11 Claims, 3 Drawing Sheets

U.S. PATENT DOCUMENTS

| | | | |
|---|---|---|---|
| 7,479,614 B2* | 1/2009 | Eastin | 209/573 |
| 7,667,604 B2* | 2/2010 | Ebert et al. | 340/572.4 |
| 7,966,398 B2* | 6/2011 | Wiles, Jr. | 709/224 |
| 2001/0049734 A1* | 12/2001 | Suwabe et al. | 709/225 |
| 2002/0090132 A1* | 7/2002 | Boncyk et al. | 382/154 |
| 2003/0148773 A1* | 8/2003 | Spriestersbach et al. | 455/456 |
| 2004/0208372 A1* | 10/2004 | Boncyk et al. | 382/181 |
| 2005/0015491 A1* | 1/2005 | Koeppel | 709/226 |
| 2005/0104719 A1* | 5/2005 | Ramamurthy et al. | 340/10.1 |
| 2005/0203870 A1* | 9/2005 | Yamada et al. | 707/1 |
| 2006/0119471 A1* | 6/2006 | Rudolph et al. | 340/10.41 |
| 2006/0168644 A1 | 7/2006 | Richter et al. | |

FOREIGN PATENT DOCUMENTS

| | | |
|---|---|---|
| KR | 10-2006-0068478 A | 6/2006 |
| KR | 10-2006-0086724 A | 8/2006 |
| KR | 10-2006-0131019 A | 12/2006 |
| KR | 10-2006-0134506 A | 12/2006 |
| KR | 10-2007-0056774 A | 6/2007 |
| KR | 10-0746482 B1 | 7/2007 |
| KR | 10-2007-0097773 A | 10/2007 |
| WO | 01/73687 A2 | 10/2001 |
| WO | 2004/074965 A2 | 9/2004 |

* cited by examiner

APPARATUS AND METHOD FOR PROVIDING URL, MOBILE STATION, AND METHOD FOR ACCESSING INTERNET BY USING THE PROVIDED URL

TECHNICAL FIELD

The present invention relates to a mobile station and a method for accessing the Internet by the mobile station. More particularly, the present invention relates to an apparatus that provides a uniform resource locator (URL) to a mobile station and a method thereof, and a mobile station that access the Internet through the URL provided by the apparatus and an Internet access method of the mobile station.

BACKGROUND ART

Recently, studies for a system using radio frequency identification (RF-ID) have been actively proposed, and commercial systems utilizing the RF-ID are used in distribution industries, inventory management, and fee collecting systems based on results of the studies. Particularly, a mobile communication provider shows mobile RF-ID technology using RF-ID technology techniques as a part of wireless data providing services.

In a system using such an RF-ID technology, a terminal typically acts as an RF-ID reader, and thus the terminal reads an RF-ID tag value attached to a movie poster or a traffic display and provides information mapped to the corresponding RF-ID tag value to a user. However, the RF-ID reader is relatively more expensive than the RF-ID tag, and therefore the price of a portable device may increase when the RF-ID reader is installed in the portable device.

Meanwhile, for web browsing through a conventional mobile station, a URL of a site that the user wants to access must be typed directly as input to a web browser. Since most of the conventional mobile stations provide an input means such as a key pad with small numbers or a touch pad, it is inconvenient for the user to type all the URLs.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a URL providing apparatus that provides a URL to a mobile station for access to the Internet through a specific URL when a user brings the mobile station into an interrogation range of an RF-ID reader included in the URL providing apparatus without additionally typing in a URL, and a method thereof.

In addition, the present invention provides a method for a mobile station to access the Internet through a provided URL, and a method for reducing addition cost of the mobile station performing the Internet access method.

Technical Solution

An exemplary URL providing apparatus according to one embodiment of the present invention includes an RF-ID reader and a local site server. The RF-ID reader reads an RF-ID tag value corresponding to identification information of a mobile station from an RF-tag attached to the mobile station and outputs the RF-ID tag value. The local site server transmits the RF-ID tag value received from the RF-ID reader to a provider server that stores an IP of the mobile station, receives the IP from the provider server, and provides a URL to a mobile station by using the IP.

An exemplary mobile station according to another embodiment of the present invention receives a URL from a URL providing apparatus and access the Internet. The mobile station includes an RF-ID tag and a controller. The RF-ID tag provides an RF-ID tag value to the URL providing apparatus when the mobile station attempts to access the Internet. The controller receives the URL from the URL providing apparatus corresponding to transmission of the RF-ID tag value and accesses the internet corresponding to the URL.

An exemplary URL providing method according to another embodiment includes reading an RF-ID tag value corresponding to identification information of a mobile station from an RF-ID tag attached to the mobile station, transmitting the RF-ID tag value to a provider server that stores an IP of the mobile station, receiving an IP corresponding to the RF-ID tag value from the provider server, and providing a URL to the mobile station that corresponds to the IP.

An exemplary method according to another embodiment of the present invention is provided to a mobile station for accessing the Internet by receiving a URL from a URL providing apparatus that provides a URL corresponding to identification information of the mobile station.

The method includes providing an RF-ID tag value to the URL providing apparatus when the mobile station attempts to access the Internet, receiving the URL from the URL providing apparatus, and automatically accessing the Internet corresponding to the URL.

MODE FOR THE INVENTION

Figure 1:
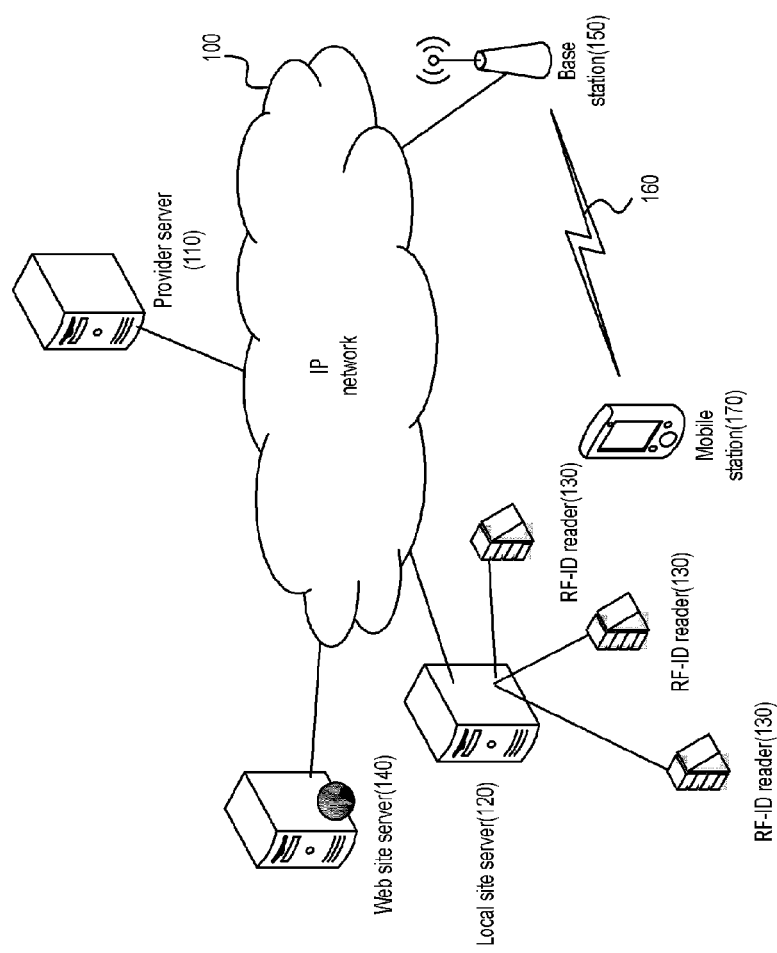
FIG. 1 is a schematic diagram of a service network that includes a URL providing apparatus that provides a URL to a mobile station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "Comprise" and variations such as "Comprises" or "Comprising" will be understood to imply the inclusion of stated elements but not the exclusion of any other elements.

A uniform resource locator (URL) providing apparatus according to an exemplary embodiment of the present invention will now be described in further detail with reference to the accompanying drawings.

FIG. 1 is a schematic diagram of a service network including a URL providing apparatus that transmits a URL to a mobile station according to an exemplary embodiment of the present invention.

As shown in FIG. 1, the service network includes a mobile station 170, a base station 150, a provider server 110, at least one radio frequency identification (RF-ID) reader 130, a local site server 120, and a web site server 140. In addition, the base station 150, the provider server 110, the web site server 140, and the local site server 120 are connected to each other through an Internet protocol (IP) network 100.

The mobile station 170 provides Internet data to a user through a radio link 160, and includes an RF-ID tag that stores a value of an RF-ID tag corresponding to identification information of the mobile station 170. Such a mobile station 170 can be provided as a portable device such as a laptop or a PDA. With acceptance of the user, the mobile station 170 drives an application program that automatically performs Internet access to a URL received from the local site server 120.

The base station 150 provides a radio access link through which the mobile station 170 can access the IP network, and enables the Internet data of the user to be transmitted/received through the IP network 100.

The provider server 110 is managed by a service provider that provides a portable Internet service to the mobile station 170, and stores an RF-ID tag value of the mobile station 170 and the corresponding IP information. In addition, when receiving a request from the local site server 120, the provider server 110 receives an RF-ID tag value of a mobile station from the corresponding local site server 120 and informs an IP address of the corresponding mobile station to the local site server 120.

The web site server 140 has a resource corresponding to the URL that the mobile station 170 of the user wants to access, and provides a web service to the user.

The IP network 100 is a network based on an IP that enables communication between the base station 150, the provider server 110, the web site server 140, and the local site server 120 based on the IP.

The URL providing apparatus according to the exemplary embodiment of the present invention may include the local site server 120 and the RF-ID reader 130 of FIG. 1, and constituent elements of the local site server 120 and the RF-ID reader 130 will now be described in further detail.

At least one RF-ID reader 130 can be connected to the local site server 120, and each RF-ID reader 130 can be located in a different space with a different identifier. Such an RF-ID reader 130 reads a RF-ID tag value of the mobile station 170 and transmits the RF-ID tag value to the local site server 120 when the mobile station 170 is located within an interrogation range of the RF-ID reader 130. At this time, an identifier of the RF-ID reader 130 is transmitted, together with the RF-ID tag value, to the local site server 120.

The local site server 120 is connected to at least one RF-ID reader 130, and transmits the RF-ID tag value of the mobile station 170, received from the RF-ID reader 130, to the provider server 110. Subsequently, the local site server 120 acquires an IP address of the mobile station 170 corresponding to the RF-ID tag value transmitted from the provider server 110, and transmits a URL to the mobile station 170 by using the acquired IP address through the IP network 100. In this case, the URL transmitted to the mobile station 170 is a value that has been set at an early setting stage. When a plurality of the RF-ID readers 130 are connected to the local site server 120, different URLs can be set to the respective RF-ID readers corresponding to identifiers of the respective RF-ID readers.

The mobile station 170 that receives a URL from the URL providing apparatus and accesses an Internet will now be described in further detail with reference to the accompanying drawings.

Figure 2:
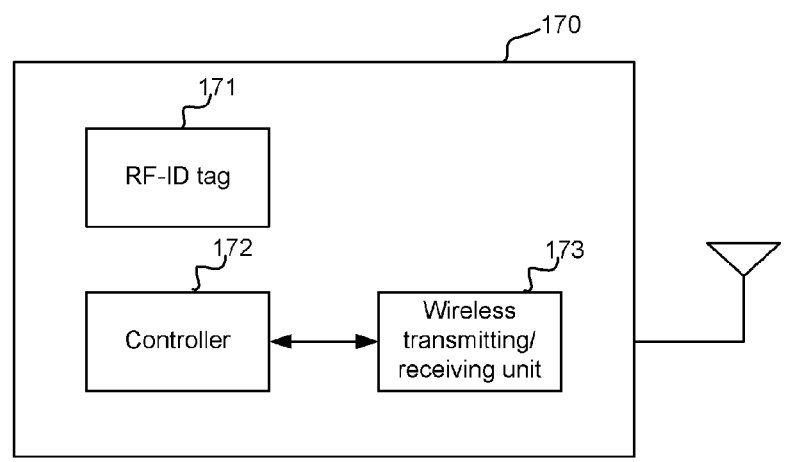
FIG. 2 is a configuration diagram of a mobile station according to the exemplary embodiment of the present invention.

FIG. 2 is a configuration diagram of the mobile station 170 according to the exemplary embodiment of the present invention.

As shown in FIG. 2, the mobile station 170 includes an RF-ID tag 171, a controller 172, and a wireless transmitting/receiving unit 173.

The RF-ID tag 171 has an RF-ID tag value that includes identification information of the mobile station 170, and the user can read the RF-ID tag value when the user brings the mobile station 170 into the interrogation range of the RF-ID reader 130.

The controller 172 has various application programs installed therein for the user, and transmits/receives Internet data transmitted/received to/from a user application program to/from the base station 150 through the wireless transmitting/receiving unit 173. In addition, the controller 172 controls the mobile station 170 to receive the URL from the URL providing apparatus through the wireless transmitting/receiving unit 173 and automatically access an Internet site or a file corresponding to the URL.

Therefore, the controller 172 has the application that automatically access a web page where the Internet site or the file by using URL, and the application program enables a typical mobile station to automatically access an Internet by attaching an RF-ID tag and updating software.

The wireless transmitting/receiving unit 173 modulates data transmitted from the controller 172 into a wireless RF signal and transmits the wireless RF signal to the base station 150, or receives a wireless RF signal received from the base station 150, demodulates the wireless RF signal, and transmits the demodulated wireless RF signal to the controller 172. Particularly, the wireless transmitting/receiving unit 173 receives a URL from the URL providing apparatus, and receives the corresponding Internet data when the mobile station 170 access an Internet site corresponding to the received URL.

Hereinafter, a method for the URL providing apparatus to provide a URL, and a method for the mobile station 170 to access an Internet corresponding to the URL will be described in further detail.

Figure 3:
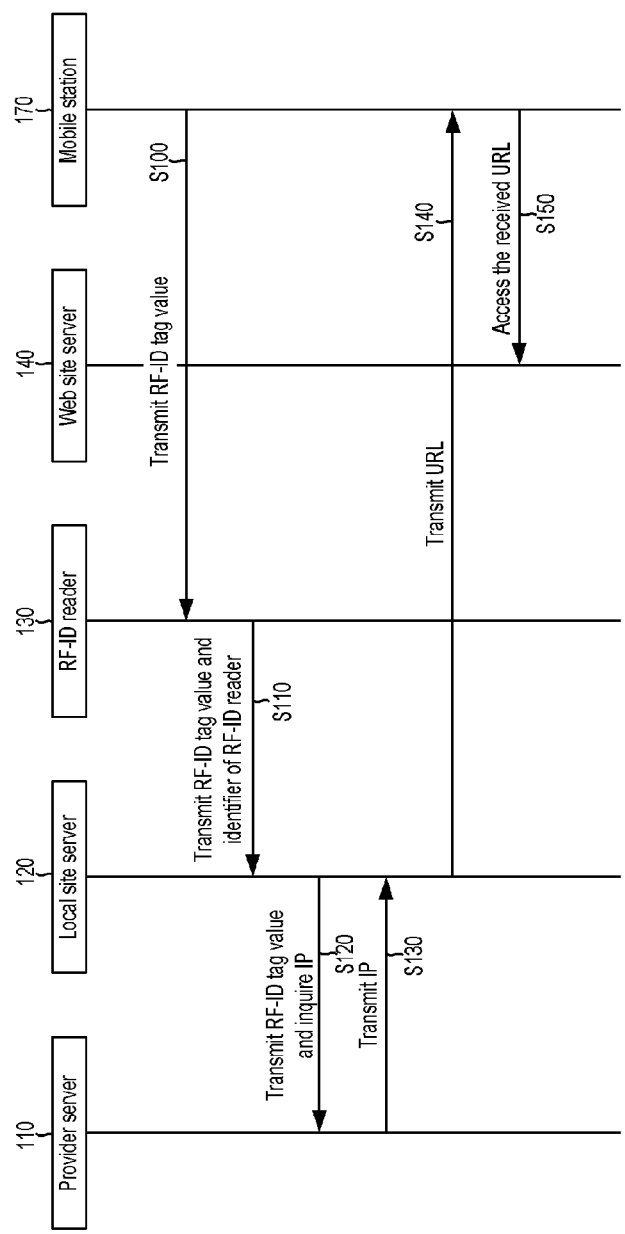
FIG. 3 is a flowchart of a method for the URL providing apparatus to provide a URL, and a method for the mobile station to access an Internet through the provided URL.

FIG. 3 is a flowchart of a method for the URL providing apparatus to provide a URL, and a method for the mobile station 170 to access an Internet corresponding to the URL.

As shown in FIG. 3, when the user locates the mobile station 170 within the interrogation range of the RF-ID reader 130 for access to the Internet, the RF-ID reader 130 reads the corresponding RF-ID tag value from the RF-ID tag 171 of the mobile station 170, in step S100. The RF-ID reader 130 transmits the RF-ID tag value read from the RF-ID tag 171 to the local site server 120, in step S110. When the plurality of RF-ID readers 130 are connected to the local site server 120, each RF-ID reader 130 transmits its identifier, together with the RF-ID tag, to the local site server 120.

When receiving the RF-ID tag value and identifier of the RF-ID reader 130 from the RF-ID reader 130, the local site server 120 transmits the RF-ID tag value to the provider server 110 that provides a portable Internet service and inquires an IP address of the mobile station 170, in step S120. The IP address provided by the provider server 110 is predetermined at a setting stage of the local site server 120.

The provider server 110 searches for an IP address of the mobile station 170 having the RF-ID tag value received from the local site server 120, and transmits a mapped IP address to the local site server 120, in step S130. When receiving the mapped IP address, the local site server 120 transmits the predetermined IP address to the mobile station 170, in step S140.

When the plurality of RF-ID readers 130 are connected to the local site server 120, the local site server 120 can transmits different URLs to the respective RF-ID readers 130 corresponding to the received RF-ID tag value and identifiers of the respective RF-ID readers 130. Accordingly, the RF-ID readers 130 located in different spaces for different purposes can transmit different URLs to the user of the mobile station 170.

When receiving the URL from the local site server 120, the mobile station 170 accesses the Internet by using the URL, in step S150. Therefore, the mobile station 170 must be provided as a portable device such as a laptop or PDA, having an application program installed therein for automatic access to the Internet by using the URL received from the local site server 120.

The URL according to the exemplary embodiment of the present invention is a method of identifying an address of an Internet accessible resource, and it may identify an address of a multimedia file such as music or motion pictures. Therefore, when the user uses the above-described method, the user can simply view a web page as well as listen to predetermined music or view a motion picture without an additional key input.

The above-described exemplary embodiment of the present invention can be commercially utilized as follows.

When it is assumed that at least one RF-ID reader is disposed in a theater, a user can be provided with movie schedules or watch movie previews by using a mobile station that can automatically access a web page showing movie schedules of the theater or a file address of a movie preview when a user brings the mobile station into an interrogation range of the RF-ID reader disposed in the theater according to the above-described Internet access method.

In addition, when it is assumed that a plurality of RF-ID readers are disposed in a shop according to the type of products sold in the shop, a user can receive desired-information by using a mobile station having a RF-ID tag since the mobile station can automatically access a web page showing features, price, and other descriptions of displayed products when the user brings the mobile station into an interrogation range of a specific RF-ID reader near product.

According to the exemplary embodiment of the present invention, a URL providing apparatus that reads a RF-ID tag value from a mobile station having an RF-ID tag and provides a URL to the corresponding mobile station, and a method thereof have a merit of enabling the mobile station to easily access an Internet.

In addition, unlike a conventional mobile station having an expensive RF-ID reader, the mobile station according to the exemplary embodiment of the present invention has an inexpensive RF-ID tag, and therefore, the price of the mobile station is not affected. When using a manual RF-ID tag, the RF-ID tag can be installed in the mobile station by simply attaching the RF-ID tag to the mobile station so that a typical mobile station that can support a portable Internet service can access Internet by performing updating in a software manner, and therefore the manual RF-ID tag can be popularized.

For a portable internet provider, a process for mapping an RF-ID tag value to an IP address of a mobile station can be easily charged, and therefore the portable Internet provider can raise additional profits through a contract with an operation station of the above-described local site server.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A uniform resource locator (URL) providing apparatus comprising:
    a radio frequency identification (RF-ID) reader for reading an RF-ID tag value corresponding to identification information of a mobile station from an RF-ID tag affixed to the mobile station and outputting the RF-ID tag value; and
    a local site server for transmitting the RF-ID tag value received from the RF-ID reader to a provider server that stores an Internet Protocol (IP) address of the mobile station, receiving the IP address corresponding to the RF-ID tag value from the provider server, and providing a URL to the mobile station by using the IP address.

2. The URL providing apparatus of claim 1, wherein the RF-ID reader transmits an identifier of the RF-ID reader when transmitting the RF-ID tag value, and the local site server provides the URL corresponding to the identifier of the RF-ID reader.

3. The URL providing apparatus of claim 2, wherein the local site server predetermines at least one URL when the local site server is set, and selects the URL corresponding to the identifier of the RF-ID reader among the at least one URL.

4. A mobile station that receives a uniform resource locator (URL) from a URL providing apparatus and accesses the Internet by using the URL, the mobile station comprising:
    a radio frequency identification (RF-ID) tag affixed to the mobile station for providing an RF-ID tag value to the URL providing apparatus via an RF-ID reader when the mobile station attempts to access the Internet; and
    a controller for receiving the URL from the URL providing apparatus corresponding to transmission of the RF-ID tag value, and accessing the Internet using the URL.

5. The mobile station of claim 4, further comprising a wireless transmitting/receiving unit for receiving the URL from the URL providing apparatus and transmitting the URL to the controller.

6. The mobile station of claim 4, wherein the RF-ID tag value comprises identification information of the mobile station, and the controller receives the URL based on an Internet Protocol (IP) address acquired by the URL providing apparatus that corresponds to an identifier of the mobile station.

7. The mobile station of claim 4, wherein the controller has an application program installed therein, the application program enabling automatic access to a web page corresponding to the URL.

8. A uniform resource locator (URL) providing method comprising:
    reading a radio frequency identification (RF-ID) tag value corresponding to identification information of a mobile station from an RF-ID tag affixed to the mobile station;
    transmitting the RF-ID tag value to a provider server that stores an Internet Protocol (IP) address of the mobile station;
    receiving an IP address corresponding to the RF-ID tag value from the provider server; and
    providing a URL to the mobile station that corresponds to the IP address.

9. The URL providing method of claim 8, wherein a different URL is provided in accordance with an identifier of an RF-ID reader that reads the RF-ID tag value.

10. A method for a mobile station to access the Internet by receiving a uniform resource locator (URL) from a URL providing apparatus that provides a URL corresponding to identification information of the mobile station, the method comprising:

providing a radio frequency identification (RF-ID) tag value of an RF-ID tag affixed to the mobile station to the URL providing apparatus via an RF-ID reader when the mobile station attempts to access the Internet;

receiving, by the mobile station, the URL from the URL providing apparatus; and automatically accessing the Internet using the URL.

11. The method of claim 10, wherein the RF-ID tag value comprises identification information of the mobile station, and the mobile station receives the URL that the URL provider has provided by using an Internet Protocol (IP) address acquired by the URL providing apparatus that corresponds to the identification information of the mobile station.

\* \* \* \* \*